United States Patent
Crombez

(10) Patent No.: US 9,557,748 B2
(45) Date of Patent: Jan. 31, 2017

(54) POWERTRAIN CREEP TORQUE CONTROL

(71) Applicant: Ford Global Technologies, LLC, Dearborn, MI (US)

(72) Inventor: Dale Scott Crombez, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 383 days.

(21) Appl. No.: 13/871,355

(22) Filed: Apr. 26, 2013

(65) Prior Publication Data
US 2014/0324318 A1   Oct. 30, 2014

(51) Int. Cl.
G05D 17/02   (2006.01)
B60W 30/18   (2012.01)

(52) U.S. Cl.
CPC ........ G05D 17/02 (2013.01); B60W 30/18054 (2013.01); B60W 30/18063 (2013.01); B60W 2540/12 (2013.01); B60W 2710/1022 (2013.01)

(58) Field of Classification Search
CPC ............ B60L 7/26; B60L 15/20; B60W 10/18
USPC ..... 701/123, 22, 31.4, 48, 68; 477/184, 185, 477/27, 93, 94; 180/65.21, 65.23, 65.1
See application file for complete search history.

(56) References Cited

U.S. PATENT DOCUMENTS

| 6,278,916 | B1 * | 8/2001 | Crombez | B60L 7/26 180/197 |
|---|---|---|---|---|
| 6,321,144 | B1 * | 11/2001 | Crombez | B60L 15/2009 303/152 |
| 7,898,405 | B2 * | 3/2011 | Burke | G01D 11/28 180/65.21 |
| 7,909,730 | B2 * | 3/2011 | Schwarz | B60W 30/18063 477/93 |
| 7,957,856 | B2 * | 6/2011 | Itoh | B60K 6/445 180/65.21 |
| 8,224,544 | B2 * | 7/2012 | Sah | B60W 30/18027 180/65.21 |
| 8,315,752 | B2 * | 11/2012 | Kwon | B60L 15/2009 318/452 |
| 8,554,419 | B2 * | 10/2013 | Crombez | B60T 7/042 180/282 |
| 8,579,765 | B2 * | 11/2013 | Yu | B60W 10/06 477/184 |
| 8,606,441 | B2 * | 12/2013 | Ueoka | B60T 7/042 180/53.2 |
| 8,718,913 | B2 * | 5/2014 | Crombez | G07C 5/004 340/439 |
| 2003/0225496 | A1 * | 12/2003 | Coelingh | B60G 17/0195 701/48 |
| 2009/0118926 | A1 * | 5/2009 | Heap | B60K 6/445 701/54 |
| 2009/0234528 | A1 * | 9/2009 | Crombez | G07C 5/0825 701/31.4 |
| 2011/0136625 | A1 * | 6/2011 | Yu | B60W 10/06 477/185 |

(Continued)

Primary Examiner — Thomas G Black
Assistant Examiner — Wae Louie
(74) Attorney, Agent, or Firm — David B. Kelley; Brooks Kushman P.C.

(57) ABSTRACT

A vehicle powertrain control system causes friction torque to be delivered to wheels at a generally constant value for a range of increasing requested friction torque values such that commanded powertrain torque values are reduced to a generally constant floor value. The range of increasing requested torque values is less than a requested powertrain torque value under foot off accelerator pedal and vehicle stop conditions.

17 Claims, 3 Drawing Sheets

(56) References Cited

U.S. PATENT DOCUMENTS

| | | | | |
|---|---|---|---|---|
| 2012/0071296 A1* | 3/2012 | Miyamoto | ............ | B60W 10/08 477/27 |
| 2013/0017928 A1* | 1/2013 | Oh | ......................... | F16H 61/20 477/94 |
| 2014/0324318 A1* | 10/2014 | Crombez | ............... | G05D 17/02 701/99 |

* cited by examiner

POWERTRAIN CREEP TORQUE CONTROL

TECHNICAL FIELD

This disclosure relates to the control of torque during foot off accelerator pedal conditions.

BACKGROUND

Certain automotive vehicles powered by conventional internal combustion engines creep under foot off pedal conditions. That is if the vehicle is in gear and a driver removes their foot from the accelerator pedal (and does not actuate the brake pedal), the vehicle will creep forward in response to the torque generated by the powertrain (assuming the vehicle is on level ground) because the powertrain is mechanically coupled to the wheels via the transmission. This torque may be referred to as creep torque.

SUMMARY

A vehicle includes a powertrain and at least one controller. The at least one controller, in response to a foot off accelerator pedal condition and requests for friction torque that exceed a threshold value received while a speed of the vehicle is approximately zero, causes friction torque to be delivered at a generally constant value such that commands for torque from the powertrain achieve a floor value. The commands are based on the torque requested from the powertrain and friction torque delivered. The threshold value is less than a predetermined value of torque requested from the powertrain during the foot off accelerator pedal condition.

A method for controlling powertrain torque of a vehicle includes requesting a predetermined amount of powertrain torque in response to a foot off accelerator pedal condition. The method also includes delivering friction torque at a generally constant amount such that commands for powertrain torque achieve a floor amount in response to requests for friction torque that exceed a threshold amount less than the predetermined amount and received while a speed of the vehicle is approximately zero.

A powertrain control system for a vehicle includes at least one controller that causes friction torque to be delivered at a generally constant value for a range of increasing requested friction torque values to cause commanded powertrain torque values to reduce to a generally constant floor value. The range of increasing requested torque values is less than a requested powertrain torque value under foot off accelerator pedal and vehicle stop conditions.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain alternatively powered vehicles such as hybrid electric vehicles generate torque at low speeds with electric machines. To simulate the feel of a conventionally powered vehicle for example, an alternatively powered vehicle may energize the electric machine under foot off pedal conditions to cause the electric machine to generate torque and thus prompt the vehicle to creep. Put a different way, an alternatively powered vehicle may request a certain amount of powertrain torque under foot off pedal conditions. If a driver subsequently steps on a brake pedal to overcome this creep torque however, energy used to energize the electric machine may be wasted.

Figure 1:
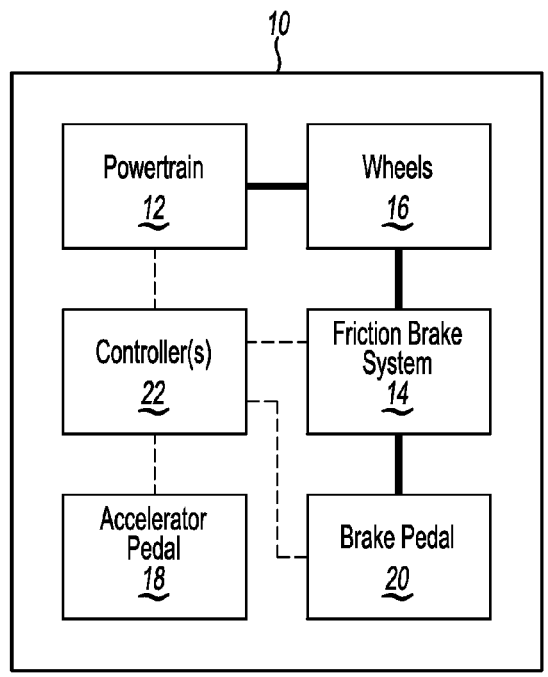
FIG. 1 is a block diagram of an automotive vehicle.

With reference to FIG. 1, an automotive vehicle 10, such as a hybrid electric vehicle, battery electric vehicle, etc., includes a powertrain 12 and friction brake system 14 mechanically coupled with wheels 16 as indicated by solid line. The powertrain 12 may include an internal combustion engine, a transmission, an electric machine, etc. arranged as known in the art to independently or cooperatively generate/provide torque to move the wheels 16. The friction brakes 14, when actuated, apply braking torque to the wheels 16. The vehicle 10 further includes accelerator and brake pedals 18, 20 and one or more controllers 22. The powertrain 12, friction brake system 14, and accelerator and brake pedals 18, 20 are in communication with/under the control of the controllers 22 as indicated by thin dashed line. The brake pedal 20 is mechanically connected with the friction brake system 14 as indicated by solid line. The controllers 22 may include a powertrain control module, a brake control module, a vehicle systems control module, etc. In other examples, the functionality discussed with reference to the controllers 22 may be implemented in a single controller. Other arrangements are, of course, also possible.

At the request of the controllers 22, the powertrain 12 (electric machine) may generate torque to move the wheels 16. A position of the accelerator pedal 18 may determine, at least partially, the amount of powertrain torque requested. As an example, the requested powertrain torque may increase proportionally with the position of the accelerator pedal 18 as the accelerator pedal 18 is actuated. A baseline amount of torque, e.g., 500 Newton meters, may be requested when the accelerator pedal 18 is not actuated to replicate the creep exhibited by conventionally powered vehicles. As mentioned above, the electric machine 12 may be used to generate the baseline or creep torque.

Figure 2:
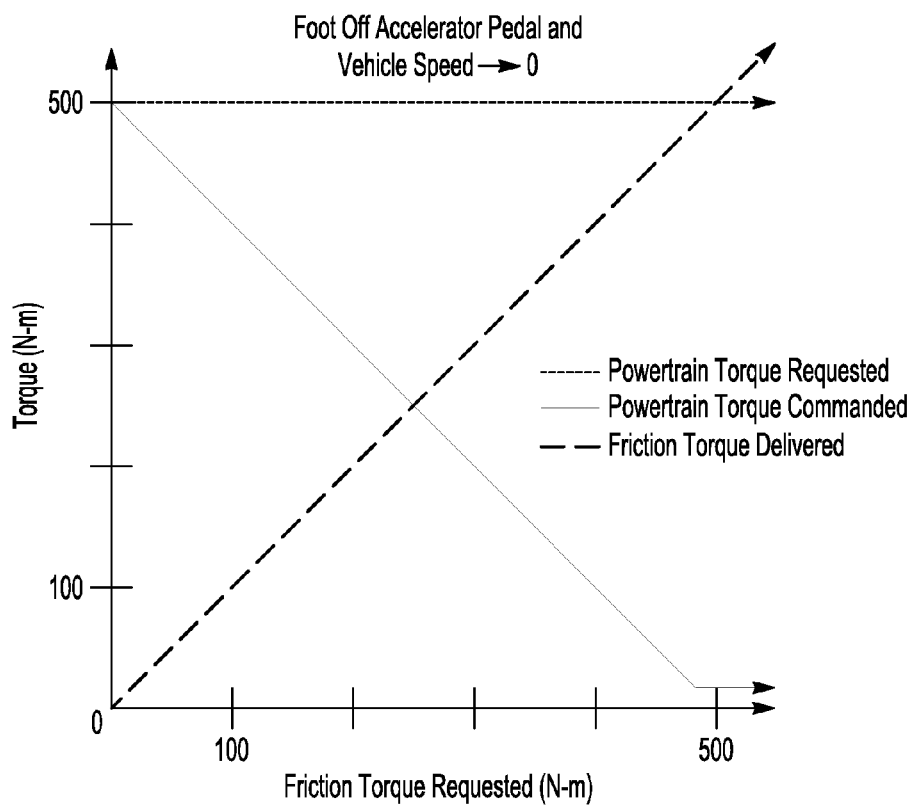
FIG. 2 is a plot of friction torque requested versus friction torque delivered, powertrain torque requested, and powertrain torque commanded under foot off accelerator pedal conditions when vehicle speed is approaching zero.

With reference to FIG. 2, the powertrain torque requested is generally constant, in this example, under foot off accelerator pedal conditions when vehicle speed is approaching zero. Additionally, the friction torque delivered increases proportionally with the friction torque requested. The friction torque requested is determined by a position of the brake pedal 20. If for example the brake pedal 20 has a travel of 100° and the friction torque requested can range from 0 to 10,000 Newton meters, at 0° (foot off brake pedal), no friction torque would be requested, at 100°, 10,000 Newton meters of torque would be requested, and at 50°, 5,000 Newton meters of torque would be requested, etc.

The powertrain torque commanded, in this example, is the difference between the powertrain torque requested and the friction torque delivered (until a floor value is achieved). That is, the control strategy is such that the powertrain torque requested is reduced 1 to 1 by the friction torque delivered to generate the powertrain torque commanded. The powertrain torque commanded decreases proportionally from 500 Newton meters to a floor of 20 Newton meters as the friction torque delivered increases from 0 Newton meters toward 500 Newton meters. The floor, in this example, is selected to ensure that gearing of the transmission 12 does not experience significant lash. The floor, in other examples, can have a different value (e.g., 35 Newton meters, 0 Newton meters, etc.) depending on design considerations and objectives.

The delivered friction torque cancels out the delivered powertrain torque at approximately 250 Newton meters (assuming a level grade and negligible system losses). The vehicle 10 will slow down and stop moving once the friction torque delivered exceeds 250 Newton meters. If the vehicle 10 is ascending an incline, the vehicle 10 may stop moving once the friction torque delivered exceeds a value less than 250 Newton meters. Likewise, if the vehicle 10 is descending a decline, the vehicle 10 may stop moving once the friction torque delivered exceeds a value greater than 250 Newton meters.

If this control strategy continues to be used even after the vehicle 10 has stopped moving, the powertrain torque commanded may be greater than the floor value. Therefore, the energy used to generate that portion of the powertrain torque delivered greater than the floor is wasted because it performs no useful function given that the vehicle 10 has stopped moving. Certain strategies described may reduce the amount of energy used to generate such unnecessary powertrain torque.

Figure 3A:
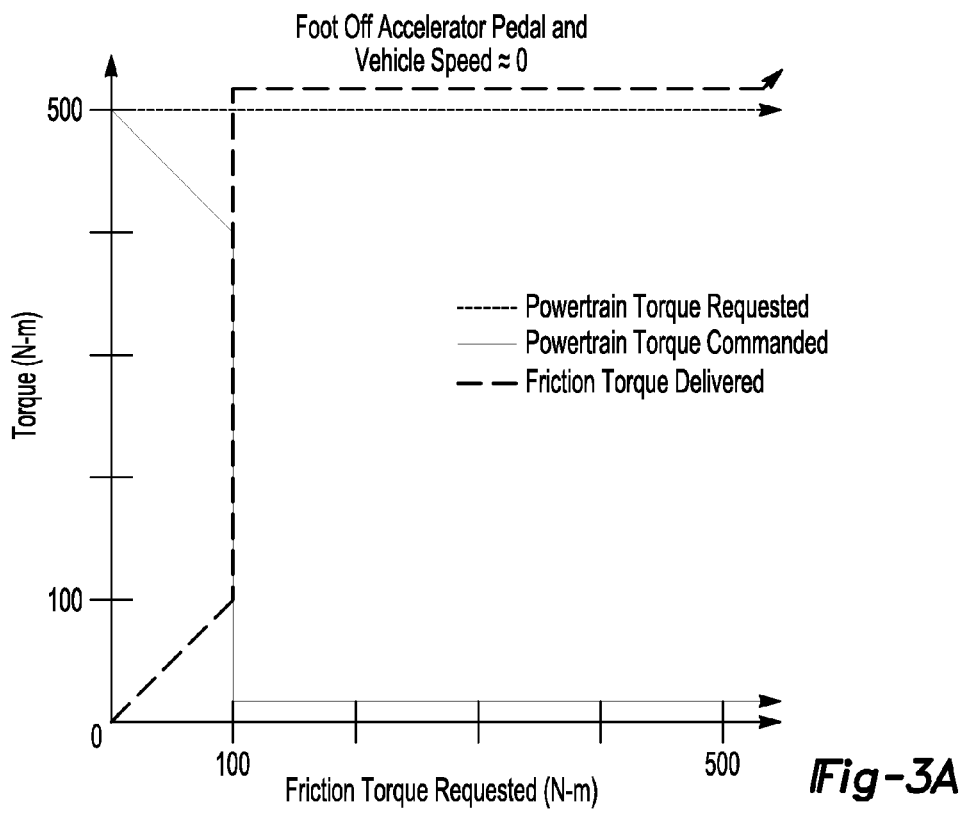
FIGS. 3A and 3B are plots of friction torque requested versus friction torque delivered, powertrain torque requested, and powertrain torque commanded under foot off accelerator pedal conditions when vehicle speed is approximately zero.

With reference to FIG. 3A, the powertrain torque requested is generally constant under foot off accelerator pedal conditions when vehicle speed is approximately zero. Additionally, the friction torque delivered increases with the friction torque requested for certain values of the friction torque requested. Otherwise, the friction torque delivered is generally constant and greater than the powertrain torque requested. In this example, the friction torque delivered increases proportionally with friction torque requests up to 100 Newton meters. For friction torque requests between 100 Newton meters and 520 Newton meters, the friction torque delivered is approximately 520 Newton meters. For friction torque requests exceeding 520 Newton meters, the friction torque delivered increases proportionally with the friction torque requested. (Other examples may of course have different values.)

The powertrain torque commanded, similar to FIG. 2, is the difference between the powertrain torque requested and the friction torque delivered (until a floor value is achieved): the powertrain torque requested is reduced 1 to 1 by the friction torque delivered to generate the friction torque commanded. The powertrain torque commanded decreases proportionally with friction torque requests up to 100 Newton meters. For friction torque requests exceeding 100 Newton meters, the powertrain torque delivered is equal to 20 Newton meters—the floor value in this example.

Comparing FIGS. 2 and 3A, the strategy of FIG. 3A reduces the range over which the powertrain torque commanded exceeds the floor value. A threshold friction torque request value (e.g., 100 Newton meters) has been selected to be less than the powertrain torque requested (e.g., 500 Newton meters). For friction torque requests less than this threshold, the friction torque delivered increases with the friction torque requested and as a result, the powertrain torque commanded decreases. For friction torque requests greater than the threshold, the friction torque delivered is greater than the powertrain torque requested, and as a result, the powertrain torque commanded achieves the floor value. This avoids circumstances, such as those described with reference to FIG. 2, in which powertrain torque continues to be delivered even though the vehicle 10 has stopped moving. Energy that would otherwise be used to generate such powertrain torque is thus conserved.

A strategy similar to that described with reference to FIG. 2 can be used under foot off accelerator pedal conditions when vehicle speed is greater than zero. A transition can then be made to a strategy similar to that described with reference to FIG. 3A once vehicle speed becomes approximately zero, to reduce energy expenditures and thus improve fuel economy. Changes in friction torque delivered and powertrain torque commanded, for a given friction torque requested, can be filtered to mask this transition from vehicle occupants. If a vehicle comes to a stop at a friction torque requested of 200 Newton meters, the friction torque delivered can be changed from 200 Newton meters (as dictated by FIGS. 2) to 520 Newton meters (as dictated by FIG. 3A) according to a filtering function to avoid any disturbances that step or sudden changes in this parameter may cause.

Figure 3B:
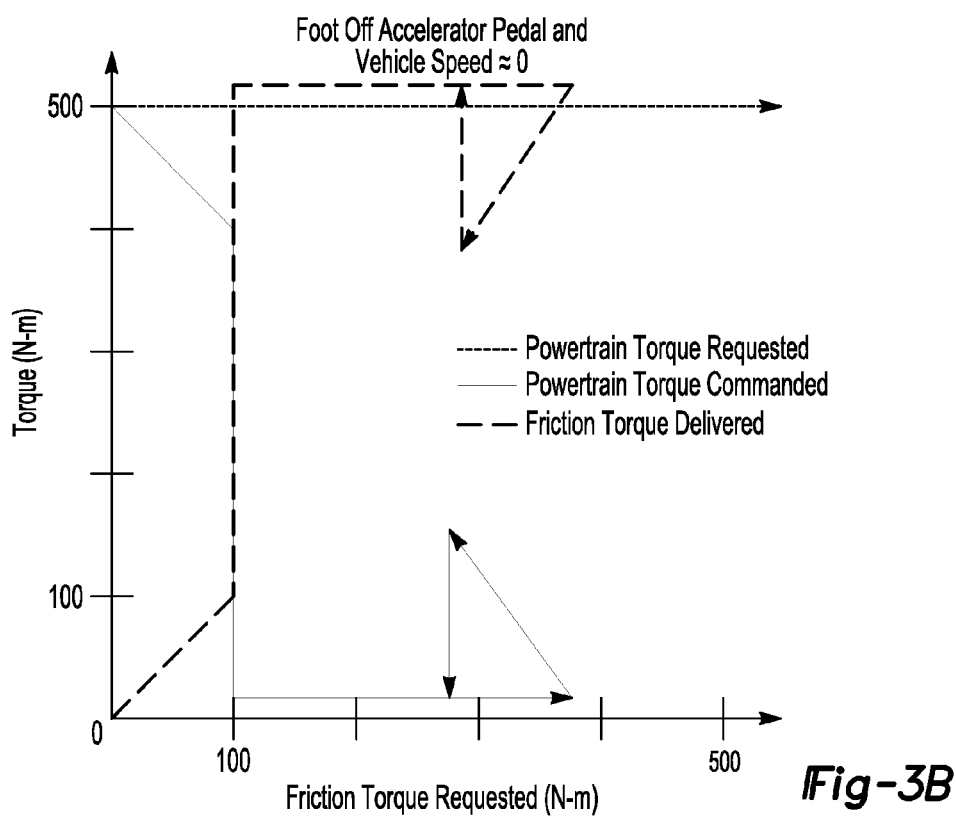

With reference to FIG. 3B, the behavior of the friction torque delivered and powertrain torque commanded is shown under circumstances in which the friction torque requested increases to approximately 370 Newton meters, decreases to approximately 280 Newton meters, and then subsequently increases. Put a different way, a driver depresses the brake pedal 20 to a position past that which would cause the vehicle 10 to stop, slightly releases the brake pedal 20, and then depresses the brake pedal 20 again. If the friction torque requested is in the range such that the powertrain torque commanded is equal to the floor value and a decrease in friction torque requested is observed (because, for example, the driver slightly releases the brake pedal 20), then the friction torque delivered decreases proportionally with the decrease in friction torque requested. As a result, the powertrain torque commanded will begin to increase from the floor. The vehicle 10 will begin to move once the powertrain torque delivered exceeds the friction torque delivered (assuming a level grade). If an increase in friction torque requested is subsequently observed (because, for example, the driver begins to again depress the brake pedal 20), the friction torque delivered will return to the value such that the powertrain torque commanded achieves the floor value. In short, the amount of friction torque delivered (and thus powertrain torque commanded) may depend not only on the amount of friction torque requested but also on whether the friction torque requested is increasing or decreasing.

Figure 4:
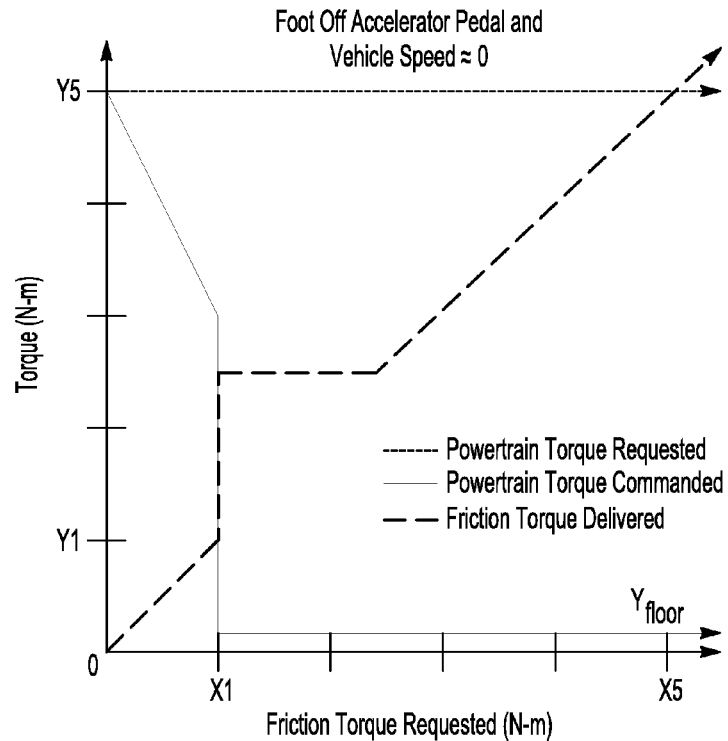
FIG. 4 is another plot of friction torque requested versus friction torque delivered, powertrain torque requested, and powertrain torque commanded under foot off accelerator pedal conditions when vehicle speed is approximately zero.

With reference to FIG. 4, the powertrain torque requested is generally constant under foot off accelerator pedal conditions when vehicle speed is greater than zero. Additionally, the friction torque delivered increases with the friction torque requested for certain values of the friction torque requested. Otherwise, the friction torque delivered is generally constant and less than the powertrain torque requested. The powertrain torque commanded, unlike that of FIGS. 2, 3A and 3B, is reduced 2 to 1 by the friction torque delivered to generate the powertrain torque commanded. The powertrain torque commanded decreases proportionally with friction torque requests up to X1 Newton meters. For friction torque requests exceeding X1 Newton meters, the powertrain torque delivered is equal to $Y_{floor}$ Newton meters—the floor value in this example.

Certain of the preceding examples used threshold friction torque requested values of 100 Newton meters and 520 Newton meters. That is with reference to FIG. 3A, the friction torque delivered is set to a value greater than the powertrain torque requested when the friction torque requested falls within this range. Other vehicles or control schemes, however, may have different threshold settings to satisfy driver expectations while still attempting to minimize energy consumption. These thresholds may be determined via testing, simulation, etc. Moreover, although substantial portions of the plots for powertrain torque requested and commanded and friction torque delivered exhibit linear behavior, other such plots could have substantial portions that exhibit nonlinear behavior. In one example, powertrain torque requested may vary under foot off accelerator pedal conditions. The friction torque delivered when the friction torque requested falls within the range defined by the upper and lower thresholds, in this circumstance, would not be constant (in contrast to the friction torque delivered of FIG. 3A). Other scenarios are also possible. Additionally, various ramping functions may be used to transition the friction torque delivered to and from the regions defined by the threshold values. Put a different way, friction torque delivered in the transition regions need not exhibit sharp corners. Such ramping functions may be selected to achieve desired behavior or to best suit controller capabilities.

Figure 5:
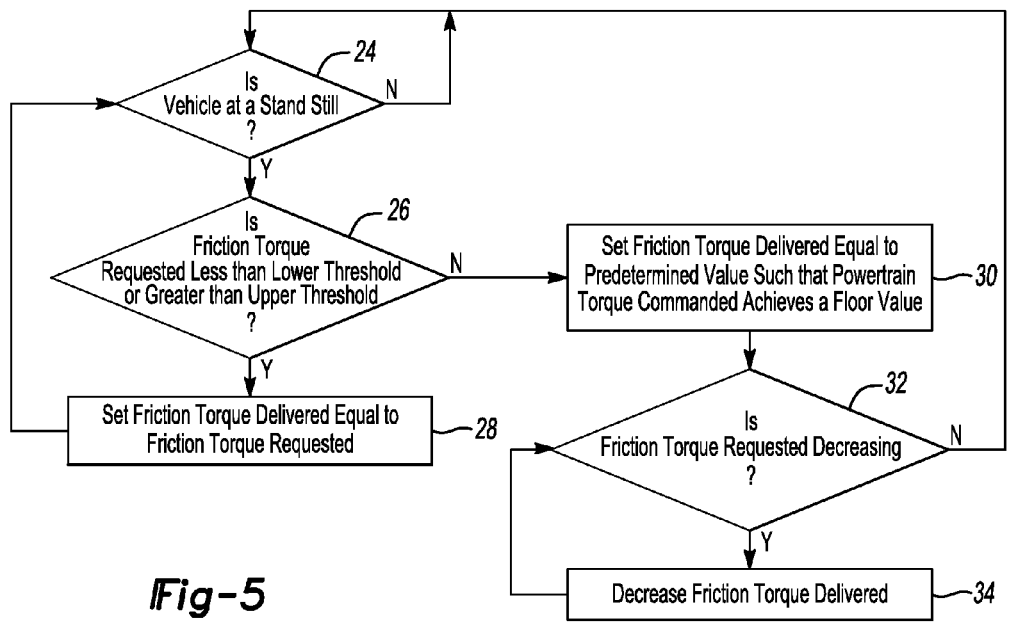
FIG. 5 is a flow chart of an algorithm for controlling powertrain torque commanded.

With reference to FIG. 5, it is determined whether a vehicle is at a stand still at operation 24. The controllers 22, for example, may read position data associated with the accelerator pedal 18 and speed data associated with the vehicle 10. If the position data is indicative of zero and vehicle speed is approximately zero, the controllers 22 may determine that the vehicle 10 is at a stand still. If the position data is indicative of something other than zero or the vehicle speed is greater than zero, the controllers 22 may determine that the vehicle 10 is not at a stand still. If no, the algorithm returns to operation 24. If yes, it is determined whether the friction torque requested is less than the lower threshold or greater than the upper threshold at operation 26. For example, the controllers 22 may read friction torque requested data from the friction brake system 14 to determine whether the friction torque requested is less than 100 Newton meters or greater than 520 Newton meters. If yes, the friction torque delivered is set equal to the friction torque requested at operation 28. The controllers 22, for example, may command the friction brake system 14 to provide the amount of torque at the wheels 16 that is being requested. The algorithm then returns to operation 24.

Returning to operation 26, if no, the friction torque delivered is set equal to a predetermined value such that the powertrain torque commanded achieves a floor value. For example, the controllers 22 may command the friction brake system 14 to provide 520 Newton meters of torque at the wheels 16 (assuming that the powertrain torque requested is 500 Newton meters and is to be reduced 1 to 1 by the friction torque delivered to generate the powertrain torque commanded). The controllers 22, as another example, may command the friction brake system 14 to provide 250 Newton meters of torque at the wheels 16 (assuming that the powertrain torque requested is 500 Newton meters and is to be reduced 2 to 1 by the friction torque delivered to generate the powertrain torque commanded). At operation 32, it is determined whether the friction torque requested is decreasing. The controllers 22, for example, may read friction torque requested data from the friction brake system 14 to determine whether the friction torque requested is decreasing. If yes, the friction torque delivered is decreased at operation 34. For example, the controllers 22 may command the friction brake system 14 to decrease the torque at the wheels 16. The algorithm then returns operation 32. If no, the algorithm returns to operation 26.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
 a powertrain; and
 at least one controller programmed to, in response to a foot off accelerator pedal condition and requests for friction torque values that exceed a threshold value received while a speed of the vehicle is approximately zero, cause friction torque to be delivered at a generally constant value such that commands for torque from the powertrain achieve a floor value, wherein the commands are based on the torque requested from the powertrain and friction torque delivered and wherein the threshold value is less than a predetermined value of torque requested from the powertrain during the foot off accelerator pedal condition.

2. The vehicle of claim 1, wherein the at least one controller is further programmed to, in response to a request for a decrease in friction torque received while causing the friction torque to be delivered at the generally constant value, cause the friction torque to be delivered to decrease such that the commands for torque from the powertrain increase from the floor value.

3. The vehicle of claim 2, wherein the at least one controller is still further programmed to, in response to a request for an increase in friction torque received while causing the friction torque to be delivered to decrease, cause the friction torque to be delivered at the generally constant value.

4. The vehicle of claim 1, wherein the at least one controller is further programmed to, in response to requests for friction torque values that exceed the generally constant value, cause the friction torque to be delivered to increase.

5. The vehicle of claim 1, wherein the generally constant value is greater than the predetermined value of torque requested from the powertrain.

6. The vehicle of claim 1, wherein the generally constant value is less than the predetermined value of torque requested from the powertrain.

7. A method for controlling powertrain torque of a vehicle comprising:
 in response to a foot off accelerator pedal condition, requesting a predetermined amount of powertrain torque; and
 in response to requests for friction torque values that exceed a threshold amount less than the predetermined amount and received while a speed of the vehicle is approximately zero, delivering friction torque at a generally constant amount such that commands for powertrain torque achieve a floor amount.

8. The method of claim 7 further comprising, in response to a request for a decrease in friction torque received while delivering the friction torque at the generally constant amount, decreasing the amount of friction torque delivered such that the commands for powertrain torque increase from the floor amount.

9. The method of claim 8 further comprising, in response to a request for an increase in friction torque received while decreasing the amount of friction torque to be delivered, delivering the friction at the generally constant amount.

10. The method of claim 7 further comprising, in response to requests for friction torque values that exceed the generally constant amount, increasing the amount of friction torque delivered.

11. The method of claim 7, wherein the generally constant amount is greater than the predetermined amount of powertrain torque.

12. The method of claim 7, wherein the generally constant amount is less than the predetermined amount of powertrain torque.

13. A powertrain control system for a vehicle comprising:
 at least one controller programmed to cause friction torque to be delivered at a generally constant value for a range of increasing requested friction torque values to cause commanded powertrain torque values to reduce to a generally constant floor value, wherein the range of increasing requested torque values is less than a requested powertrain torque value under foot off accelerator pedal and vehicle stop conditions.

14. The system of claim 13, wherein the at least one controller is further programmed to cause the friction torque delivered to decrease from the generally constant value in response to decreasing requested friction torque values within the range.

15. The system of claim 13, wherein the generally constant floor value is zero.

16. The system of claim 13, wherein the generally constant value is greater than the requested powertrain torque value.

17. The system of claim 13, wherein the generally constant value is less than the requested powertrain torque value.

* * * * *